United States Patent [19]

Krebs et al.

[11] Patent Number: 5,448,759
[45] Date of Patent: Sep. 5, 1995

[54] METHOD FOR EFFICIENT BANDWIDTH UTILIZATION WHEN TRANSCEIVING VARYING BANDWIDTH MESSAGES

[75] Inventors: Jay R. Krebs, Crystal Lake; Gayle K. Haller, Glencoe, both of Ill.

[73] Assignee: Motorola, Inc., Schaumburg, Ill.

[21] Appl. No.: 109,551

[22] Filed: Aug. 20, 1993

[51] Int. Cl.$^6$ .............................................. H04B 7/00
[52] U.S. Cl. ................................ 455/54.1; 455/38.4; 455/56.1; 340/825.44
[58] Field of Search ................... 455/38.1, 38.4, 54.1, 455/54.2, 455/56.1, 220, 228; 340/825.44

[56] References Cited

U.S. PATENT DOCUMENTS

| | | | |
|---|---|---|---|
| 4,613,859 | 9/1986 | Mori | 455/38.4 |
| 4,837,858 | 6/1989 | Ablay et al. | 455/34 |
| 5,287,551 | 2/1994 | Gustafson, Jr. et al. | 455/54.1 |

*Primary Examiner*—Edward F. Urban
*Assistant Examiner*—Mary M. Lin
*Attorney, Agent, or Firm*—Timothy W. Markison; Daniel C. Crilly

[57] ABSTRACT

In a communication system, a method that efficiently utilizes bandwidth of communication resources when transmitting first and second bandwidth messages to a communication unit may be accomplished in the following manner. When a central processor receives a message for the communication unit, it determines whether the message is of a first bandwidth message type or a second bandwidth message type. When the message is of the first bandwidth message type, the central processor transmits the message to the communication unit via a communication resource that is used primarily for transceiving first bandwidth type messages. When the message is of the second bandwidth message type, the central processor prepares a first bandwidth notification message and transmits it to the communication unit via the communication resource. The first bandwidth notification message informs a user of the communication unit that the central processor has the second bandwidth type message for it. When the user desires to receive the message, a request is sent to the central processor, which subsequently transmits the message on a communication resource that is primarily used for transceiving second bandwidth type messages.

6 Claims, 2 Drawing Sheets

100

METHOD FOR EFFICIENT BANDWIDTH UTILIZATION WHEN TRANSCEIVING VARYING BANDWIDTH MESSAGES

FIELD OF THE INVENTION

This invention relates generally to radio communication systems and, in particular, to a radio communication system that utilizes communication resources to transceive varying bandwidth messages.

BACKGROUND OF THE INVENTION

As is known, radio communication systems typically include communication units that communicate via communication resources. Communication resources are defined by the multiplexing scheme utilized in the particular communication system. For example, with frequency division multiplexing (FDM), the communication resource may be a frequency carrier or pair of frequency carriers; whereas, with time division multiplexing (TDM), the communication resource may be a time slot or pair of time slots in one or more time frames. To control allocation of the communication resources, the communication system employs a central controller to allocate and maintain the communication resources. In addition, the central processor generally provides access to a telephone switching network when a communication unit's user desires to converse with a telephone service subscriber.

Communications in wireless communication systems generally necessitate communication resources with bandwidths appropriate for the type of communication. For example, voice and long data messages, such as file transfers or facsimile transmissions, require wider bandwidths than short data messages, such as pages. Present day wireless communication systems are constructed to support either wide bandwidth (long) messages or narrow bandwidth (short) messages, but not both. The decision to utilize separate systems for long and short messages is based on spectral, or bandwidth, efficiency since transceiving long messages on a short message system requires multiple short messages and transceiving short messages on a long message system results in unused, or wasted, bandwidth. Therefore, users that utilize both wide and narrow bandwidth messages are currently required to access two separate messaging systems.

In contrast, wireline communication systems, such as public telephone and computer networks, do provide means for transceiving both long and short data messages. However, these systems do not allow simultaneous reception of both message types. Therefore, when a computer user is receiving a long message, or large file, over a computer network, the user cannot receive a short electronic mail message without an interruption in the reception of the long message. Alternatively, in a telephone network with "call waiting", a telephone subscriber's current conversation is interrupted with a "clicking" sound while being notified of another incoming call.

Therefore, a need exists for a more efficient method of transceiving varying bandwidth messages in a single wireless communication system without introducing the service interruptions present in wireline communication systems.

DESCRIPTION OF A PREFERRED EMBODIMENT

Generally, the present invention provides a method for efficient communication resource bandwidth utilization when transmitting first (short) and second (long) bandwidth messages to a communication unit. This is accomplished when a central processor receives a message for the communication unit and determines whether the message is of a first bandwidth message type or a second bandwidth message type. When the message is of the first bandwidth message type, the central processor transmits the message to the communication unit via a communication resource that is used primarily for transceiving first bandwidth type messages. When the message is of the second bandwidth message type, the central processor prepares a first bandwidth notification message and transmits it to the communication unit via the communication resource, which can be done without interruption of current services. The first bandwidth notification message informs a user of the communication unit that the central processor has the second bandwidth type message for it, which the user can access at the user's convenience. When the user desires to receive the message, a request is sent to the central processor, which subsequently transmits the message on a communication resource that is primarily used for transceiving second bandwidth type messages. With such a method, the communication system more efficiently utilizes communication resource bandwidth by deferring transmission of the second bandwidth type message until the communication unit requests to receive it.

Figure 1:
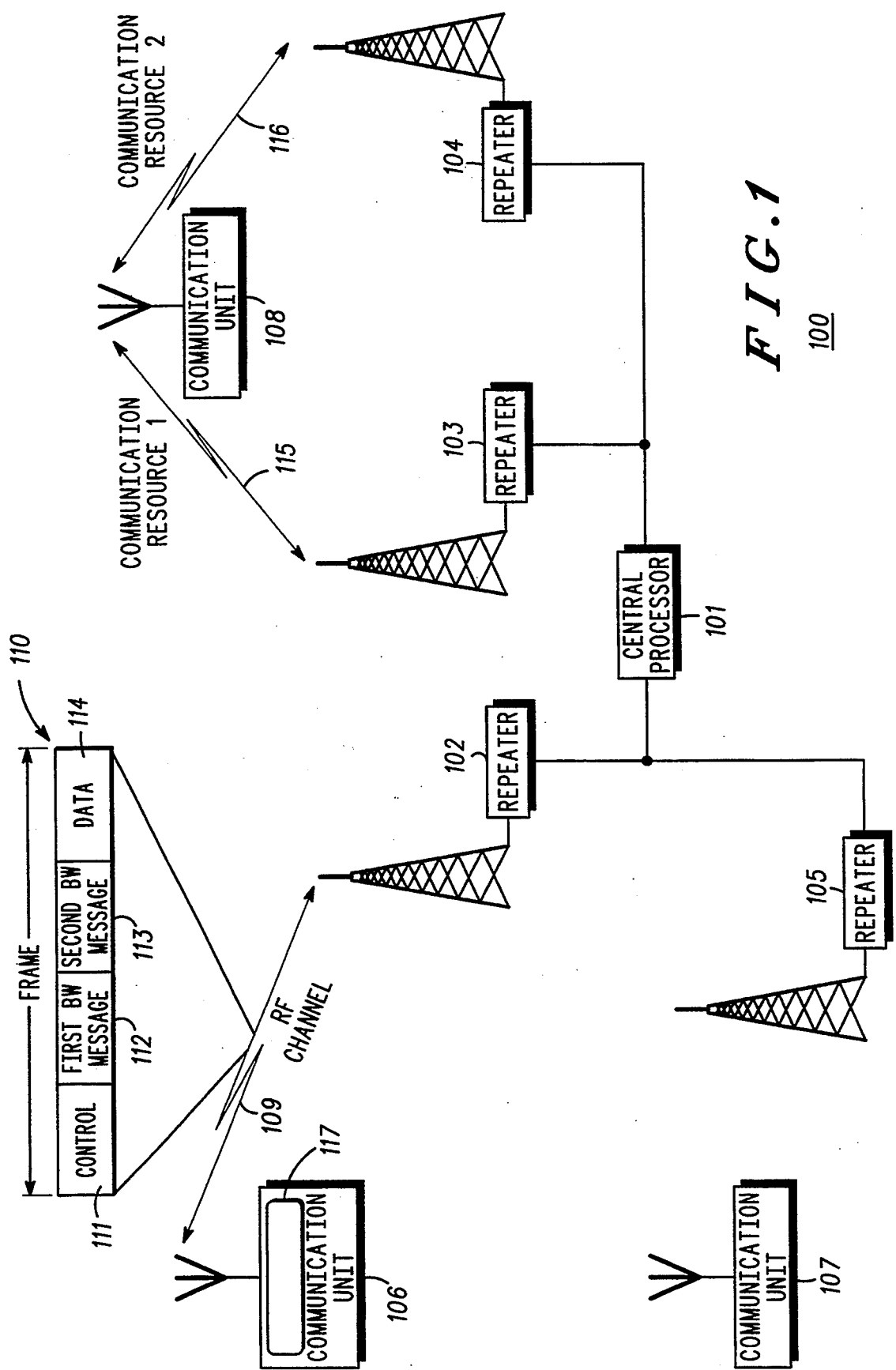
FIG. 1 illustrates a communication system in accordance with the present invention.

The present invention can be more fully described with reference to FIGS. 1 and 2. FIG. 1 illustrates a communication system 100 that includes a central processor 101, a plurality of repeaters or paging broadcast units 102–105 that transceive a limited number of communication resources 111–116, and a plurality of communication units 106–108 each having a display 117. The central processor may comprise a central controller and a data processing element that includes communication protocols, data storage (memory), queuing means, a communication unit data base, and message scheduling algorithms. Alternatively, the data processing element may comprise multiple processing elements which may be centrally located or distributed on a computer network.

The communication resources 111–114 are preferably time slots or portions of time slots in a time division multiple access (TDMA) time frame 110, while communication resources 114–115 are radio frequency (RF) channels. Messages and other communications are transmitted over the RF channels 114–115 using known TDMA channelization and access methodology. TDMA, as utilized in the present invention, uses combinations of data transmitted in discrete time slots to form the communication resources 111–114. These communication resources 111–114 may support a variety of message bandwidths (data transmission capacity) by periodically interleaving the messages at different rates.

First and second bandwidth messages 112-113 are transmitted via their respective communication resources using different interleaving rates. First bandwidth messages 112 are preferably transmitted at a twelve to one interleaving rate. That is, every twelfth time slot is used to transmit the first bandwidth messages 112. The time slots used to transmit first bandwidth messages 112 are only allocated for the duration of the first bandwidth message transmission. Upon conclusion of the first bandwidth message 112, the previously allocated time slots are deallocated and made available for other communications. Alternatively, the first bandwidth messages 112 may be transmitted in the same time slots as other communication messages, such as digitized voice, facsimile, or various types of data, by substituting redundancy bits from the other communication messages with data bits of the first bandwidth messages 112. This alternative transmission scheme allows the first bandwidth messages 112 to be simultaneously transmitted with the other communication messages. The previously described techniques for transmitting first bandwidth messages 112 are suitable for short messages of at most 140 ASCII characters, but are less efficient for delivering longer messages. On the other hand, second bandwidth messages 113 are transmitted at lower interleaving rates, such as four to one or six to one, which accommodate long messages and provide faster transfer times than higher rates, but use more system bandwidth and, accordingly, have higher transmission costs than first bandwidth messages 112.

Control 111 and additional data information 114 are transmitted in time slots which are not typically used for first or second bandwidth messages 112-113. Control information 111 is generally used to allocate and deallocate the time slots used for the first and second bandwidth messages 112-113 and is transmitted in its own time slot. However, as previously discussed, the first bandwidth messages 112 and the additional data 114 may share time slots to provide simultaneous transmission of their respective information.

Figure 2:
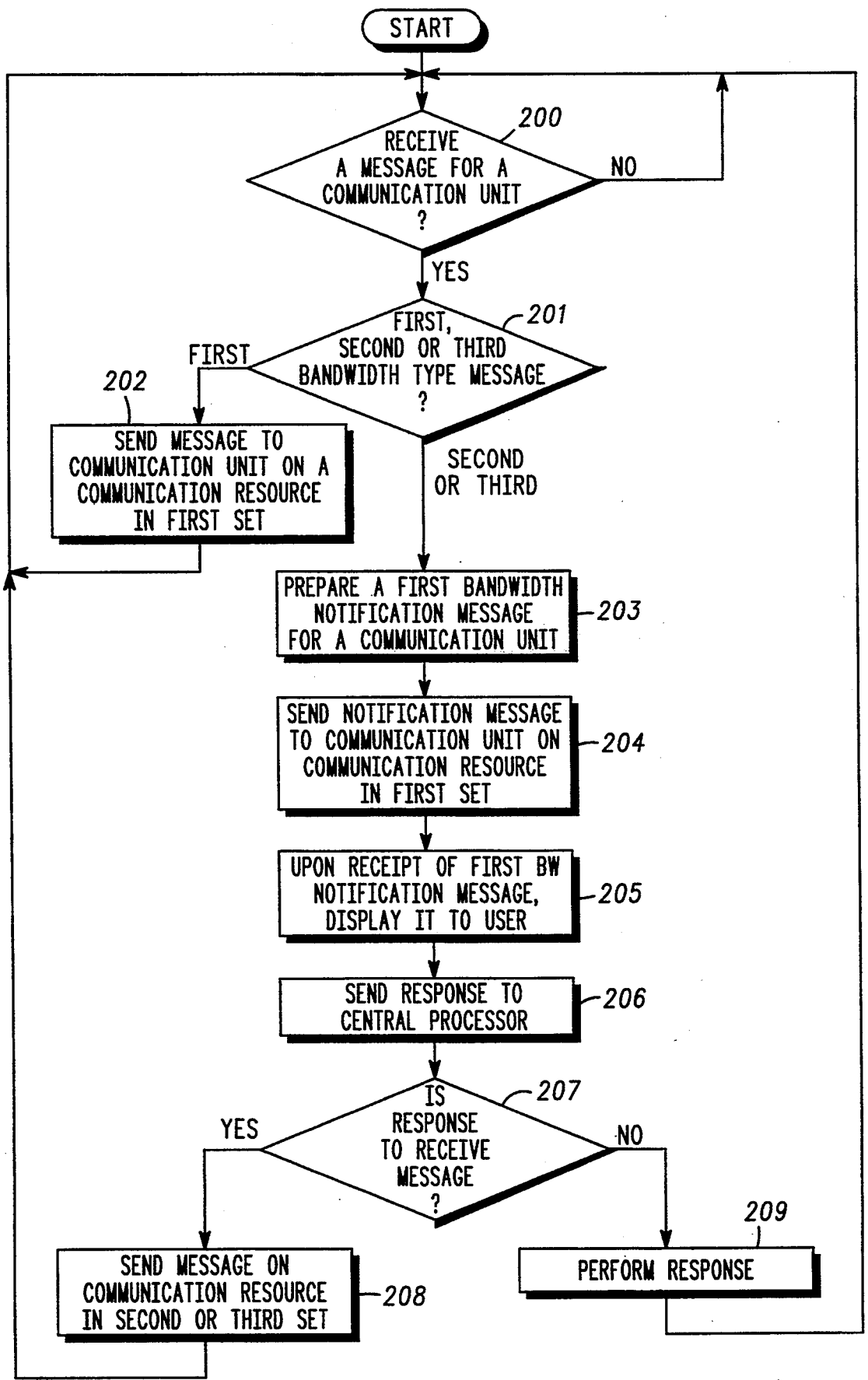
FIG. 2 illustrates a flow diagram of steps executed by a central processor and a communication unit in accordance with the present invention.

FIG. 2 illustrates a logic flow diagram of steps executed to implement the present invention. Entering the flow diagram at the START block, logic flow proceeds to decision block 200 where the central processor determines whether it received a message for an operable communication unit. An operable communication unit is a communication unit that is currently registered with the central processor. The communication unit registers with the central processor by sending a registration packet to the central processor when its power is activated by its user. Upon registering, the central processor authorizes the communication unit to be on the communication network and communicates, via control information, with the communication unit while the communication unit is within the network's coverage area. The central processor continuously monitors the communication unit's operational status, such as attachment or detachment from the network, location updates, authentication, and service requests.

When a message is not received for the operable communication unit, the central processor continues to check for other received messages. When the message is received or generated by the central processor, the central processor determines whether the message is of a first bandwidth message type, a second bandwidth message type, or a third bandwidth message type 201. As briefly mentioned above with reference to FIG. 1, first bandwidth messages are short messages of at most 140 ASCII characters. Second bandwidth messages are longer messages than first bandwidth messages, but shorter than third bandwidth messages. For example, a first bandwidth message may be a phone number or a command entered from a computer keyboard, a second bandwidth message may be a single page facsimile or a long data file, and a third bandwidth message may be multiple data files or a multiple page facsimile. Thus, first bandwidth messages have narrower bandwidths than second bandwidth messages which, in turn, have narrower bandwidths than third bandwidth messages. In the most general case, the communication system only utilizes first and second bandwidth messages.

The varying bandwidth messages generally originate from wireline or wireless communication system users, but may also be generated by the central processor. For example, in a wireline system, a message may originate from a telephone subscriber or a computer that is interconnected with the telephone network. Alternatively, in a wireless system, the message may originate from a communication unit or a peripheral device that is interconnected to a communication unit. Further, the central processor may generate its own message, such as a system maintenance schedule, for a particular communication unit.

Regardless of the origin of the message, the central processor selects the type of bandwidth message based on the message size and user preferences. Messages that are less then 140 bytes long are transmitted using the first bandwidth message type since they can be entirely delivered via a communication resource that is primarily used for transmitting first bandwidth messages. Messages containing more than 140 bytes are queued in the central processor's memory for delivery by either second or third bandwidth message types. The type of message bandwidth with which to transmit the long message is selected based on service criteria such as cost or time required to deliver the message.

When the message is of the first bandwidth message type, the central processor transmits the message to the operable communication unit, via a repeater, on a communication resource in a first set 202. Communication resources in the first set are primarily used for transmitting short messages (under 140 characters) and may be either time slots or portions of time slots in a TDMA time frame or RF channels. Note that only one communication resource may comprise the first set. The central processor transmits received first bandwidth messages immediately since they have the narrowest bandwidth, cost the least to transceive, and insure maximum system efficiency. Upon transmitting the message, the central processor continues monitoring for other received messages.

When the message is either of the second bandwidth message type or the third bandwidth message type, the central processor prepares a first bandwidth notification message for the operable communication unit 203. The first bandwidth notification message is a first bandwidth message that notifies the operable communication unit of the second or third bandwidth message resident for it in the central processor's memory. The first bandwidth notification message typically contains the originator of the message, a summary of the message, the date sent, the length of the message, priority, and cost to retrieve the entire message over the network. Upon preparing the first bandwidth notification message, the central processor transmits, or sends, the first bandwidth notification message to the operable communication unit, via the repeater, on the communication resource in the first set 204.

When the operable communication unit receives the first bandwidth notification message, the notification message is displayed to the user 205. The operable communication unit displays the notification message to the user via its display screen. Since a typical display screen can only display about 36 characters of the message at a time, the user may need to utilize a message scrolling function to read messages incorporating more than 36 characters. Messages are generally displayed with the priority messages on top, but may be displayed in any alternative format. In addition, the communication unit may be pre-programmed by the user to automatically delete messages from unwanted originators, forward messages to other communication units, or delay receipt of long messages until nonprime transmission times. Note that the first bandwidth notification message is displayed without interruption of a service in which the communication unit is presently involved. This feature is further discussed below.

Upon observing the first bandwidth notification message, the user sends a response to the central processor via the operable communication unit 206. The response may comprise a receive message request, a delete message request, a forward message request, or a save message request. The response is generally sent to the central processor immediately following the display of the first bandwidth notification message, but it may also be delayed, in which case, the central processor continues to store the message in its memory. Depending on system configuration, delaying the response to a later time of the day, when system traffic is lighter, may reduce service costs for receiving the message. If a response is not received within a predetermined period of time (e.g. 3 weeks), the central processor deletes the stored message. This time period allows the user ample time to receive any stored messages without overwhelming the memory of the central processor.

Upon receipt of the response, the central processor determines whether the response is the receive message request 207. When the response is to receive the message, the central processor transmits the message to the operable communication unit, via the repeater, on a communication resource in either a second or third set of communication resources, depending on the type of message 208. Similar to the first set of communication resources described above, the second and third sets of communication resources may be time slots or portions of time slots in the TDMA frames or RF channels and may comprise only one communication resource each. When the message is of the second bandwidth message type, the message is transmitted on a communication resource in the second set. Similarly, when the message is of the third bandwidth message type, the message is transmitted on a communication resource in the third set. The second bandwidth message preferably uses a TDMA slot interleaving rate of six to one while the third bandwidth message uses multiple consecutive time slots to deliver the message at higher transfer rates. Upon transmitting the message to the operable communication unit, the logic flow returns to block 200 and the central processor continues to monitor for received messages.

While receiving second or third bandwidth type messages, the operable communication unit may receive additional first bandwidth type messages from the central processor. As previously discussed with reference to FIG. 1, first bandwidth messages may be transmitted in the same time slots as second and third bandwidth messages (i.e. digitized voice, facsimile, or various types of data) by substituting redundancy bits from those messages with data bits of the first bandwidth messages. Thus, the operable communication unit may simultaneously receive both a first bandwidth message and a second or third bandwidth message from the central processor. Since the two message types are received simultaneously by the operable communication unit, the communication unit may display the first bandwidth message (e.g. a first bandwidth notification message) to its user without interrupting the second or third bandwidth message. However, in this case, the user cannot respond to the first bandwidth message until the second or third bandwidth message is either completed or interrupted. Prior art radio packet data systems do not provide this feature. Rather, in prior art systems, the communication unit can only receive or transmit a single message or packet type at any given time. Therefore, during reception of a long, time consuming, low priority message, the user remains unaware of newly arriving short messages that may require immediate attention. The present invention utilizes the simultaneous transmission and reception feature to provide immediate notification to the user of new first bandwidth messages regardless of the other bandwidth type messages that may be in progress.

When the user's response to the first bandwidth notification message is not to receive the message 207, the central processor performs the function of the response 209. The response function may be deleting the message, saving the message, or forwarding the message to an alternate communication unit as identified in a forward message request. Upon performing the required function, the logic flow returns to block 200 and the central processor continues to monitor for received messages.

The present invention provides a method for more efficient bandwidth utilization when transmitting variable bandwidth messages to a communication unit. With this invention, bandwidth in a communication system is conserved by allowing a user of the communication unit to control transmission of wide bandwidth (long) messages. Thus, the user may either choose to receive these messages during non-peak periods when excess bandwidth is available and service costs are lower, delete the messages prior to transmission, or forward the messages to alternate communication units. In addition, the present invention combines the benefits of both short and long messaging services into a single messaging system. Further, the present invention provides simultaneous delivery of short and long messages and, accordingly, removes the limitations imposed by prior art packet radio systems. Still further, by minimizing the number of transmitted wide bandwidth messages, the present invention improves the bandwidth efficiency.

We claim:

1. In a communication system that includes a plurality of communication units, a limited number of communication resources, and a central processor, wherein a first set of the limited number of communication resources transmits first bandwidth messages and a second set of the limited number of communication resources transmits second bandwidth messages, wherein the second bandwidth messages have substantially greater bandwidth than the first bandwidth messages, a method for more efficient bandwidth utilization when transmitting first bandwidth messages and second bandwidth messages to a communication unit, the method comprises the steps of;
  a) receiving, by the central processor, a message for the communication unit;
  b) determining, by the central processor, whether the message is of a first bandwidth message type or a second bandwidth message type;
  c) when the message is of the first bandwidth message type, transmitting, by the central processor, the message to the communication unit via a communication resource in the first set;
  d) when the message is of the second bandwidth message type, preparing, by the central processor, a first bandwidth notification message, wherein the first bandwidth notification message indicates that the central processor has the message for the communication unit; and
  e) transmitting, by the central processor, the first bandwidth notification message to the communication unit via the communication resource in the first set, the method
further comprises the steps of:
  f) while participating in a second bandwidth message, receiving, by the communication unit, the first bandwidth notification message;
  g) without interrupting the second bandwidth message, displaying, by the communication unit, the first bandwidth notification message to a user of the communication unit; and
  h) upon interruption or completion of the second bandwidth message, responding, by the user, to the first bandwidth notification message.

2. In a communication system that includes a plurality of communication units, a limited number of communication resources, and a central processor, wherein a first set of the limited number of communication resources transmits first bandwidth messages and a second set of the limited number of communication resources transmits second bandwidth messages, wherein the second bandwidth messages have substantially greater bandwidth than the first bandwidth messages, a method for more efficient bandwidth utilization when transmitting first bandwidth messages and second bandwidth messages to a communication unit, the method comprises the steps of:
  a) receiving, by the central processor, a message for the communication unit;
  b) determining, by the central processor, whether the message is of a first bandwidth message type or a second bandwidth message type;
  c) when the message is of the first bandwidth message type, transmitting, by the central processor, the message to the communication unit via a communication resource in the first set;
  d) when the message is of the second bandwidth message type, preparing, by the central processor, a first bandwidth notification message, wherein the first bandwidth notification message indicates that the central processor has the message for the communication unit; and
  e) transmitting, by the central processor, the first bandwidth notification message to the communication unit via the communication resource in the first set, wherein a third set of the limited number of communication resources transmits third bandwidth messages and wherein the third bandwidth messages have substantially greater bandwidth than the second bandwidth messages, step (b) further comprises determining whether the message is of the first bandwidth message type, the second bandwidth message type, or a third bandwidth message type.

3. In the method of claim 2, step (d) further comprises, when the message is either of the second bandwidth message type or the third bandwidth message type, preparing the first bandwidth notification message.

4. In a communication system that includes a plurality of communication units, a limited number of communication resources, and a central processor, wherein a first set of the limited number of communication resources transmits first bandwidth messages and a second set of the limited number of communication resources transmits second bandwidth messages, wherein the second bandwidth messages have substantially greater bandwidth than the first bandwidth messages, a method for the central processor to transmit the first bandwidth messages and the second bandwidth messages to a communication unit with more efficient bandwidth utilization, the method comprises the steps of:
  a) generating a message for the communication unit, wherein the message is either of a first bandwidth message type or a second bandwidth message type;
  b) when the message is of the first bandwidth message type, transmitting the message to the communication unit via a communication resource in the first set;
  c) when the message is of the second bandwidth message type, preparing a first bandwidth notification message, wherein the first bandwidth notification message indicates that the central processor has the message for the communication unit; and
  d) transmitting the first bandwidth notification message to the communication unit via the communication resource in the first set,
wherein a third set of the limited number of communication resources transmits third bandwidth messages and wherein the third bandwidth messages have substantially greater bandwidth than the second bandwidth messages, step (a) further comprises generating the message for the communication unit, wherein the message is either of the first bandwidth message type, the second bandwidth message type, or a third bandwidth message type.

5. In the method of claim 4, step (c) further comprises, when the message is either of the second bandwidth message type or the third bandwidth message type, preparing the first bandwidth notification message.

6. In a communication system that includes a plurality of communication units, a limited number of communication resources, and a central processor, wherein a first set of the limited number of communication resources transmits first bandwidth messages and a second set of the limited number of communication resources transmits second bandwidth messages, wherein the second bandwidth messages have substantially greater bandwidth than the first bandwidth messages, a method for a communication unit to receive the first bandwidth messages and the second bandwidth messages from the central processor with more efficient bandwidth utilization, the method comprises the steps of:
  a) receiving a message from the central processor via a communication resource in the first set; and b) when the message is of a second bandwidth message type, displaying a first bandwidth notification message to a user of the communication unit, wherein the first bandwidth notification message indicates that the central processor has the message of the second bandwidth message type for the communication unit, wherein the method further comprises the steps of:

c) while participating in a second bandwidth message, receiving the first bandwidth notification message;
d) without interrupting the second bandwidth message, displaying the first bandwidth notification message to the user of the communication unit; and
e) upon interruption or completion of the second bandwidth message, responding, by the user, to the first bandwidth notification message.

* * * * *